US012103766B1

(12) United States Patent
Vernon

(10) Patent No.: US 12,103,766 B1

(45) Date of Patent: Oct. 1, 2024

(54) GROUNDSKEEPING RECEPTACLE WITH INTEGRATED TRASH PICKER RETAINER

(71) Applicant: Theodore Vernon, Skokie, IL (US)

(72) Inventor: Theodore Vernon, Skokie, IL (US)

( * ) Notice: Subject to any disclaimer, the term of this patent is extended or adjusted under 35 U.S.C. 154(b) by 0 days.

(21) Appl. No.: 18/661,849

(22) Filed: May 13, 2024

(51) Int. Cl.
*B65F 1/14* (2006.01)
*B65F 1/00* (2006.01)
*E01H 1/12* (2006.01)

(52) U.S. Cl.
CPC ................ *B65F 1/14* (2013.01); *B65F 1/004* (2013.01); *E01H 1/12* (2013.01)

(58) Field of Classification Search
CPC ............... B65F 1/14; B65F 1/004; E01H 1/12
USPC ................................................. 220/23.4, 909
See application file for complete search history.

(56) References Cited

U.S. PATENT DOCUMENTS

| | | | | |
|---|---|---|---|---|
| 251,566 A | | 12/1881 | Fuller | |
| 3,796,453 A | | 3/1974 | Grimes | |
| 4,235,343 A | | 11/1980 | Thompson | |
| D325,341 S | | 4/1992 | Balavich | |
| 5,135,116 A | | 8/1992 | Panzetti | |
| 5,316,398 A | | 5/1994 | Chandaria et al. | |
| 5,611,450 A | * | 3/1997 | DeMars | B65F 1/14 15/257.3 |
| 6,024,240 A | * | 2/2000 | Howard | B65F 1/004 220/495.11 |
| D479,985 S | | 9/2003 | Lowance | |
| 7,025,924 B2 | | 4/2006 | Lowance | |
| D627,228 S | | 11/2010 | Kruetzkamp et al. | |
| 9,682,817 B2 | | 6/2017 | Rudiak | |
| 9,932,147 B1 | | 4/2018 | Ahlm et al. | |
| 10,384,831 B2 | | 8/2019 | Mahakis et al. | |
| 11,019,898 B2 | * | 6/2021 | Ripple | A47G 23/0241 |
| 2008/0197030 A1 | * | 8/2008 | Wang | B65F 1/1607 206/216 |
| 2011/0220655 A1 | * | 9/2011 | Yang | B65F 1/004 220/908 |

FOREIGN PATENT DOCUMENTS

| | | |
|---|---|---|
| CN | 201647495 U | 11/2010 |
| CN | 215973282 U | 3/2022 |
| EP | 0616956 A1 | 9/1994 |

* cited by examiner

*Primary Examiner* — Stephen J Castellano

(74) *Attorney, Agent, or Firm* — Lesley A. Wallerstein, LLC

(57) ABSTRACT

A groundskeeping receptacle has a sidewall with an indentation dimensioned to accept and retain by snap fit a trash picker having a pair of jaws, a lower stem and an upper stem. The interior surface of the sidewall further comprises a pair of diametrically opposed vertical guides, into which a selectively removable divider slides. The exterior surface of the sidewall comprises a plurality of female accessory attachment points, to which a person can attach accessories such as pockets, having at least one corresponding male attachment points.

5 Claims, 8 Drawing Sheets

GROUNDSKEEPING RECEPTACLE WITH INTEGRATED TRASH PICKER RETAINER

BACKGROUND OF THE INVENTION

This invention is directed to groundskeeping receptacles with improved means to retain a trash picker. People who collect trash on the side of the road, in parks, or in the woods, typically carry trash pickers and empty plastic garbage bags. They also wear protective gloves. They lean over, grasp a piece of trash off the ground, stop, hold open a bag to collect the trash, then release the trash into the bag. They walk further scoping out the next object to grasp. In the online outdoor navigation game called Geocaching, players regularly schedule "Cache In, Trash Out" events to clean their local parks, trails, forest preserves and neighborhoods. Most players have their own trash pickers for just such occasions.

We know from firsthand experience that cleaning a site is a lot of just carrying the trash picker and garbage bag in between scattered beer cans, plastic bottles, cigarettes and gum wrappers. Not all trash is easy to pick up from a standing position. Many times, the person needs to lean over or squat and physically dislodge the item from the soil, all while maneuvering the trash picker and the increasingly heavy garbage bag. Someone still needs to hold the bag open to drop in the trash. Sometimes a person has a friend to help hold the bag open; other times not. Over the course of an entire cleanup event, all of those moves add up to a lot of repetitive movement. It gets exhausting.

We should be encouraging people to get out and remove trash, but it is tiring and back-breaking work. Ordinary trash bags, while cheap, are difficult for one person to hold open while simultaneously operating the trash picker. We need a way to make trash collection easier and more ergonomic. To that end, I created a reusable groundskeeping receptacle with trash picker storage built right into the side of the receptacle. So, there is less to carry, I made an indentation in the sidewall of a groundskeeping receptacle, this indentation dimensioned to accept by tight snap fit, the jaws and lower stem of a trash picker. This allows the person to carry both the receptacle and the trash picker with a single hand, or even hands-free. I make the receptacle even more convenient by adding multiple female accessory attachment points on the sidewall. People can add any number of storage pockets or carrying straps to these points.

SUMMARY OF THE INVENTION

This is a groundskeeping receptacle with integrated trash picker storage. The receptacle comprises a continuous sidewall attached to a generally flat bottom, thereby defining an interior space. You can optionally add a lid. A key feature of the receptacle is a trash picker-shaped indentation molded into the sidewall. This indentation is oriented with the jaws of the trash picker facing the bottom of the receptacle, and the upper stem of the trash picker extending upward beyond the top of the receptacle. The indentation extends partway into and further defines the interior space of the receptacle. A removable rigid divider completely divides the interior space in half from top to bottom. This allows the person to separate trash as they collect it, even liquid trash.

BRIEF DESCRIPTION OF THE DRAWINGS

FIG. 9 is a cross section view of FIG. 1, showing the divider inserted there in.

REFERENCE NUMERALS

Figure 1:
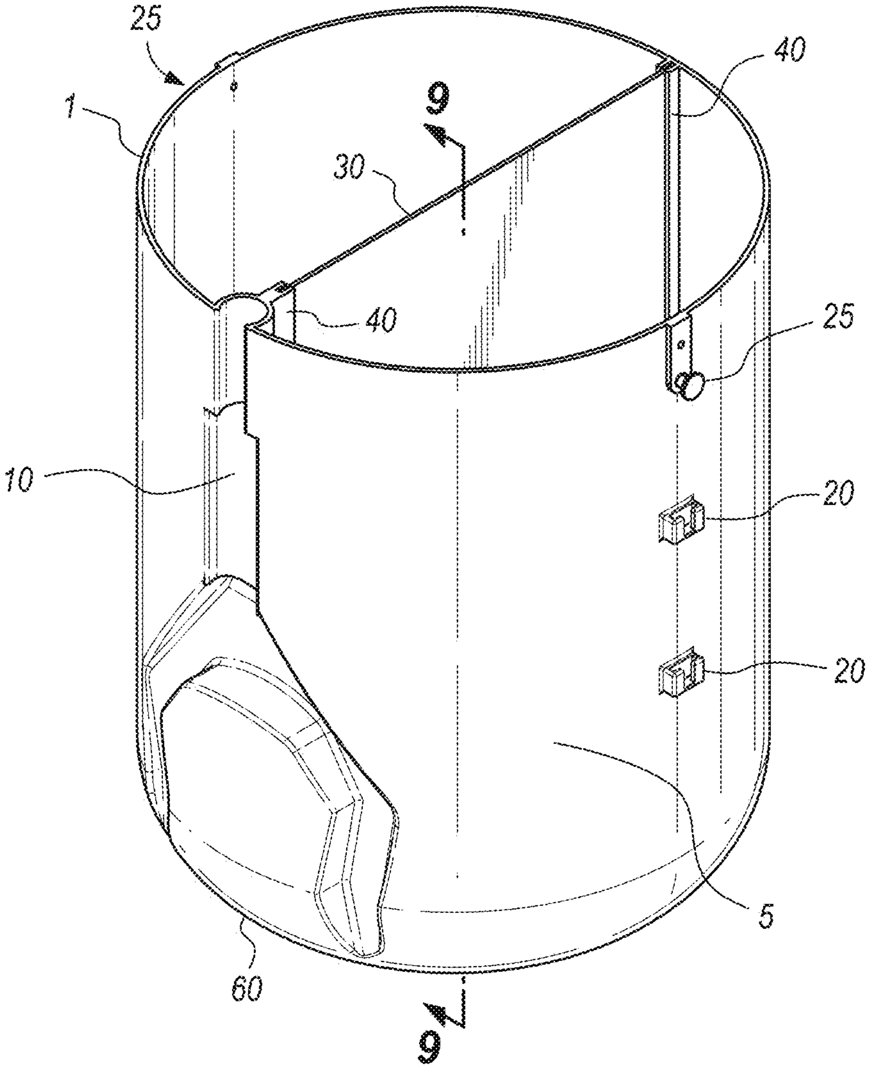
FIG. 1 is a front perspective view of a groundskeeping receptacle with integrated trash picker retainer.
Figure 2:
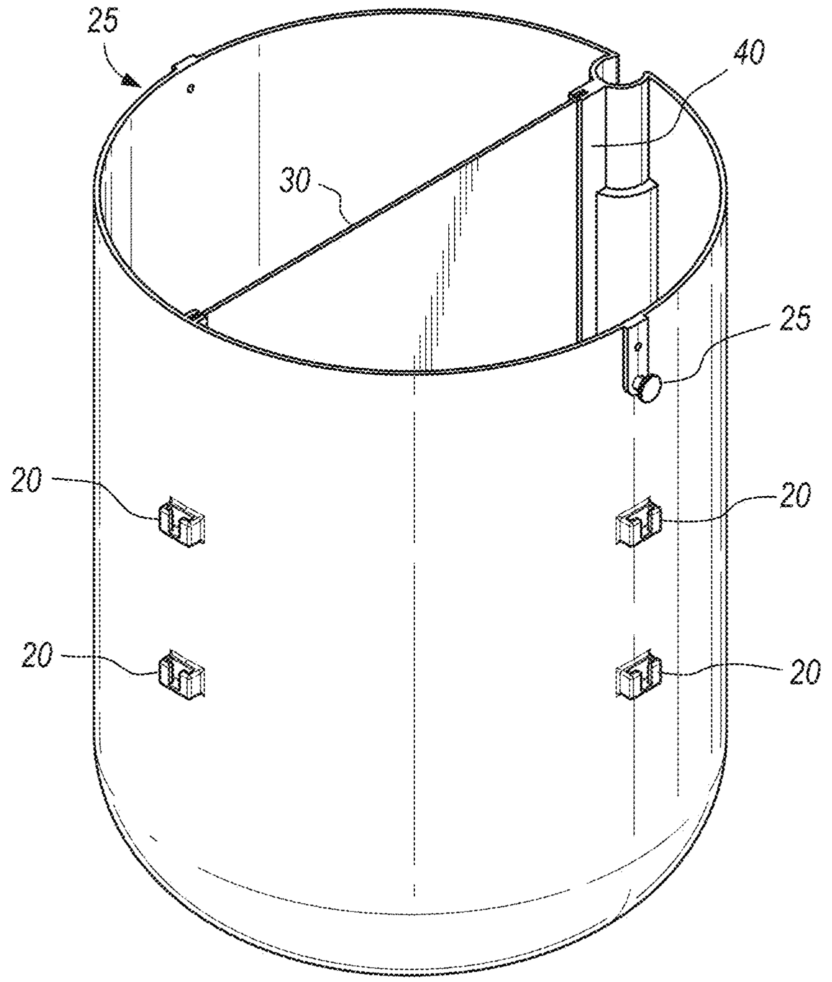
FIG. 2 is a back perspective view thereof.
Figure 3:
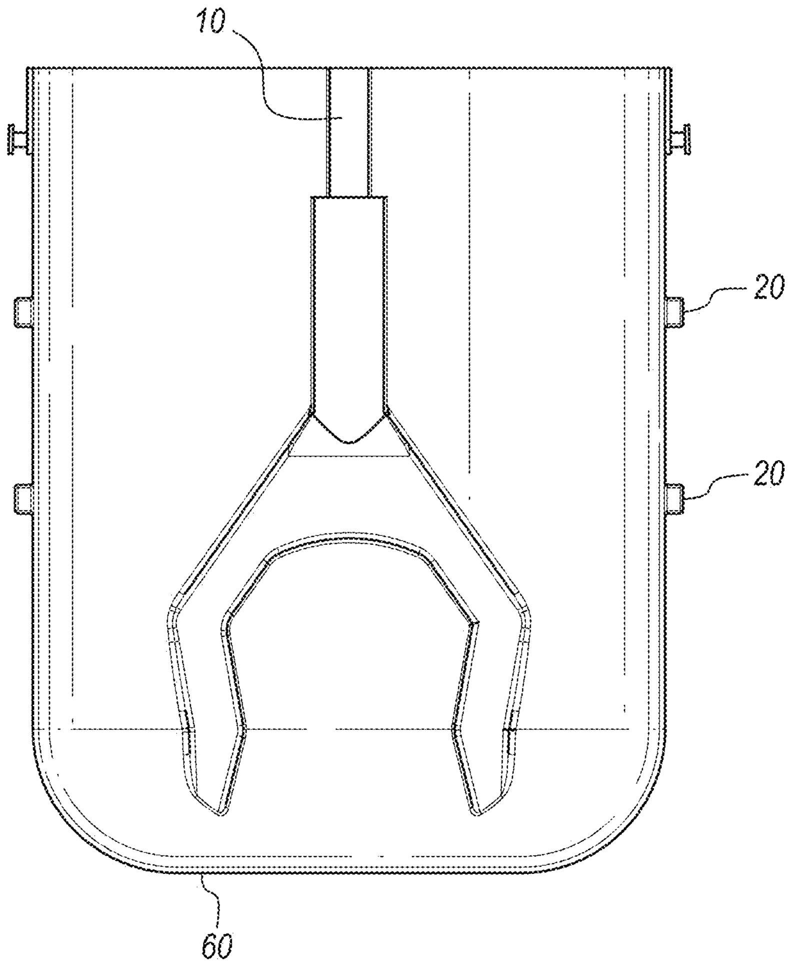
FIG. 3 is a front perspective view thereof.
Figure 4:
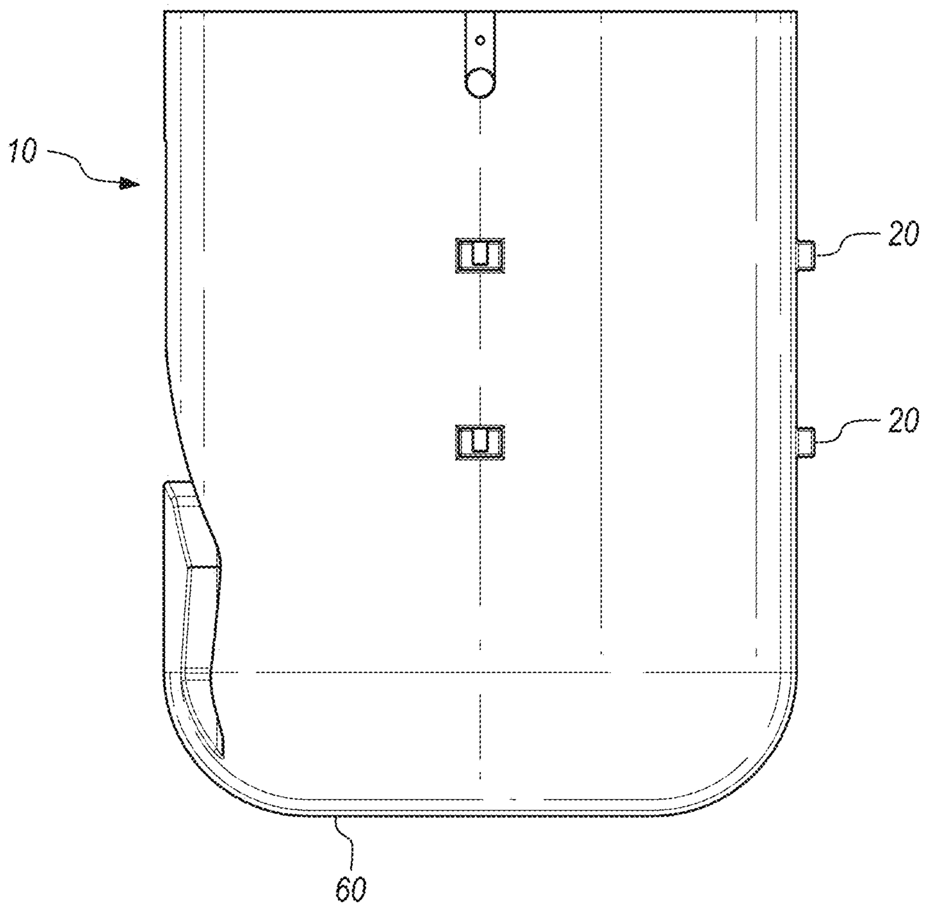
FIG. 4 is a left side view thereof.

1 Groundskeeping receptacle
5 Sidewall
10 Indentation
20 Female accessory attachment point
25 Button
30 Removable divider
35 Pocket
40 Vertical guide
50 Interior space
60 Bottom of receptacle
70 Divider-bottom joint

DETAILED DESCRIPTION OF THE INVENTION

FIG. 1 shows a front perspective view of the groundskeeping receptacle with integrated trash picker retainer 1. Trash pickers come in different configurations, but this receptacle is optimized to retain models having an upper stem, a lower stem, which then splits into two jaws. The upper stem has a trigger, or other mechanism, which, when squeezed or otherwise actuated, draws the jaws together. This is what grabs trash or other objects.

The receptacle comprises a bottom 60 and sidewall 5 attached to and rising vertically upward from the bottom, thereby defining an interior space. The sidewall has an exterior surface, an interior surface, a top circumferential edge opposite the bottom, and an indentation of a lower stem of a trash picker made into the top circumferential edge, this indentation extending downward along the sidewall toward the bottom and branching out into two jaws, this indentation dimensioned to selectively accept and retain by snap fit a pair of jaws and lower stem of a trash picker. So, the top circumferential edge is not a perfect circle; it is indented at the top.

I mount to the exterior surface of the sidewall two diametrically opposed buttons 25 and a plurality of female accessory attachment points 20. In the model illustrated, there are 6 female accessory attachment points 20. In the model illustrated, when viewed from above, I mount a pair of female accessory attachment points 20, 90 degrees to the right of the indentation, when viewed from above. We mount another pair directly opposite the indentation, and a third pair mounded 90 degrees to the left of the indentation. Also in this model, the female accessory attachment points are positioned one directly above the other. It is possible to add more or fewer female accessory attachment points and position them in different places on the sidewall 5, without departing from the spirit of the invention.

Figure 7:
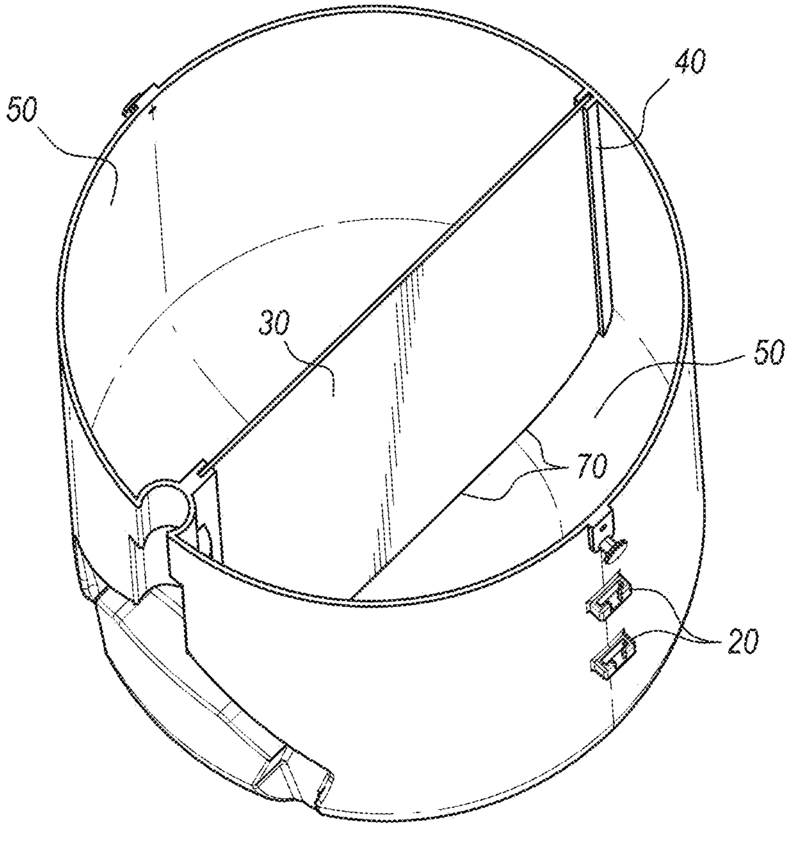
FIG. 7 is a top perspective view thereof.
Figure 8:
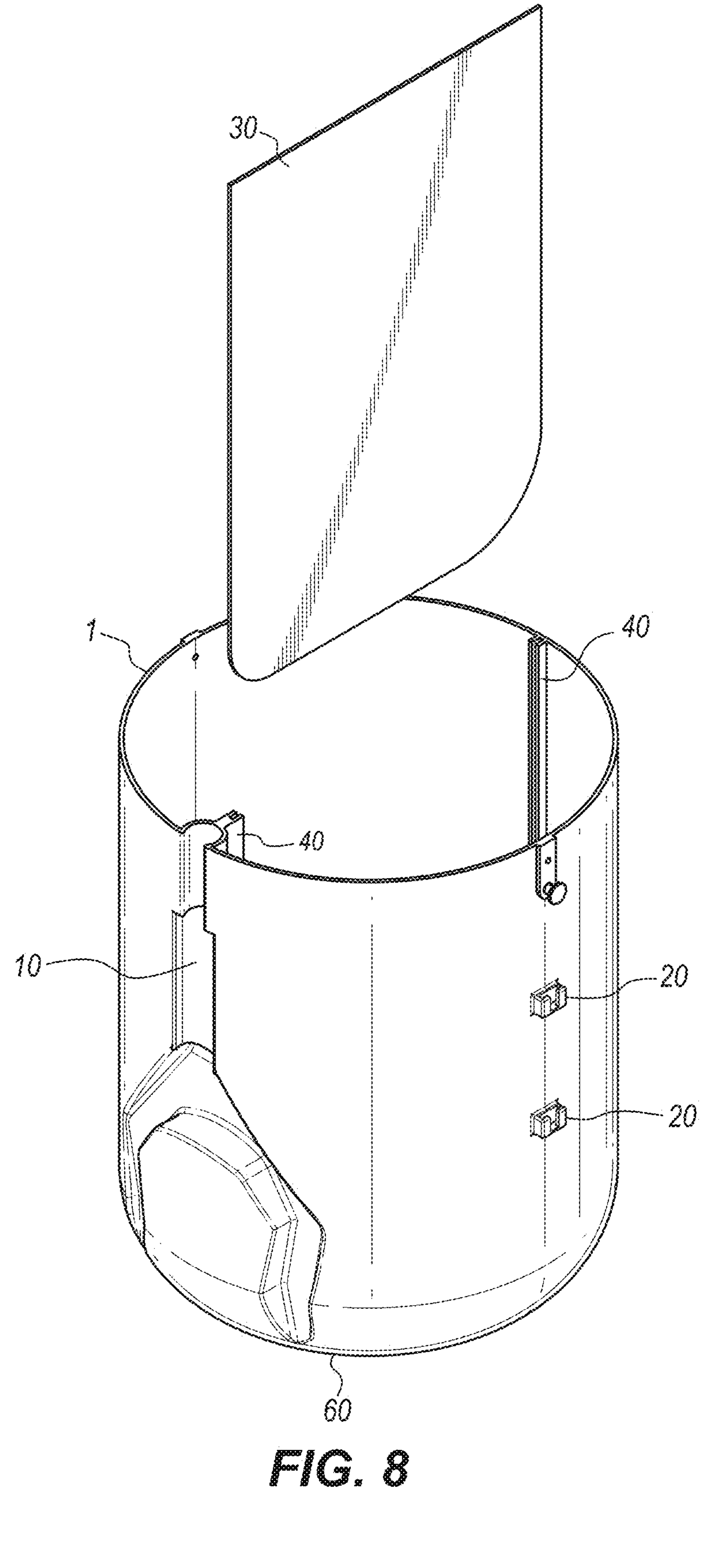
FIG. 8 is a second front perspective view thereof, showing a divider there above.
Figure 9:
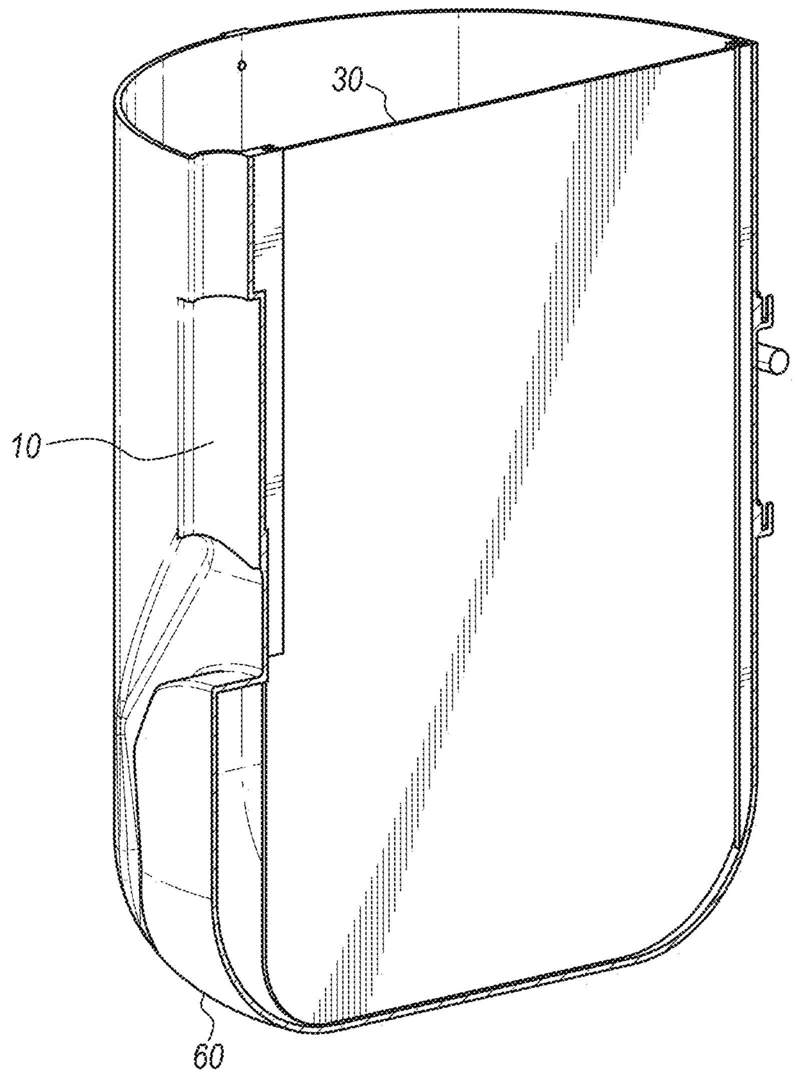

I indent the exterior surface of sidewall 5 in the shape of the jaws and lower stem of a trash picker. This indentation 10 extends into the interior space. I mount to the interior surface of the sidewall two diametrically opposed vertical guides 40. I attach a first vertical guide 40 to the interior surface of the sidewall, directly against the indentation. I attach a second vertical guide 40 to a diametrically opposed interior surface of the sidewall. Together, these surface and shape elements define an interior space of the receptacle. Removable divider 30 slides into the vertical guides and completely subdivides the interior space in half. Divider-bottom joint 70 is a tight joint-no liquid is able to pass between the two halves. Please see FIG. 7. With divider 30 inserted and pressing directly against the indentation also helps the indentation retain its shape after repeatedly snapping the jaws of the trash picker there into.

The female accessory attachment points 20 are integral and molded as one with and onto the sidewall of the receptacle. They are not separate pieces to affix to the sidewall. Preferably, the female accessory attachment points secure pockets and other accessories to the sidewall by a slide-and-lock mechanism, and this is what is shown for purposes of illustration. These pockets and other accessories have male accessory attachment points that couple to the female attachment points. Other accessory attachment mechanisms are possible and fall within the scope of the invention. In the model shown, slide-and-lock style female accessory attachment points project from the exterior surface of the sidewall. Each female accessory attachment point comprises a back, two opposing arms projecting from the back, defining a space into which a male counterpart slides. The arms of the female accessory attachment point secure the male counterpart from moving left and right; the bottom of the female accessory attachment point supports its male counterpart against gravity.

On FIG. 1, the model shows the buttons positioned at the top of the exterior surface of the sidewall, above a corresponding pair of female accessory attachment points, and facing the exterior space. It is possible to position the buttons 25 elsewhere on the exterior surface of the sidewall as long as they are circumferentially spaced apart from the indentation and the handle or strap remains clear of the trash picker stem while being retained in this way. These buttons are dimensioned to accept and couple to loops from a carrying handle or strap, not illustrated. Attaching a handle or strap to the receptacle allows a person to carry it hands-free. Other handle attachment mechanisms are possible and fall within the scope of the invention.

Preferably the receptacle, the divider and the female accessory attachment points are made from high-density polyethylene (HDPE), but one can easily substitute other materials that are equally rigid, durable and easy to reproducibly manufacture. Preferably, the receptacle is 12 to 15 inches tall, 10 to 12 inches across and holds 3.5-5.2 gallons, but these are only preferences. Other sizes and dimensions are possible. Preferably, the HDPE has a density of 0.0358 lb/cu-in, tensile strength of 21.9 MPa, modulus of elasticity 0.995 GPa, elongation at break of 581%. A matching lid, if desired, should also preferably be made of the same material chosen for the receptacle, divider, and female accessory attachment points.

The indentation tightly grabs the jaws and lower stem of the trash picker and retains it tightly against and into the receptacle. It is a tight, snap fit, which retains the trash picker even when the person swings the receptacle or turns the receptacle upside down. The upper stem of the trash picker, not shown, extends straight upward beyond the rim of the receptacle sidewall 5. The person simply pulls the trash picker out of the indentation when he wants to use it again.

Indentation 10 is preferably positioned midway, 90 degrees, from and between the buttons 25 and female accessory attachment points 20. Positioned in this way, the upper most stem of the trash picker does not catch the handle or, carrying strap, if used. Because trash pickers vary in size and shape, the receptacle would be custom molded to fit a specific model of trash picker. Preferably the trash picker and receptacle are sold together as a complete kit.

Figure 5:
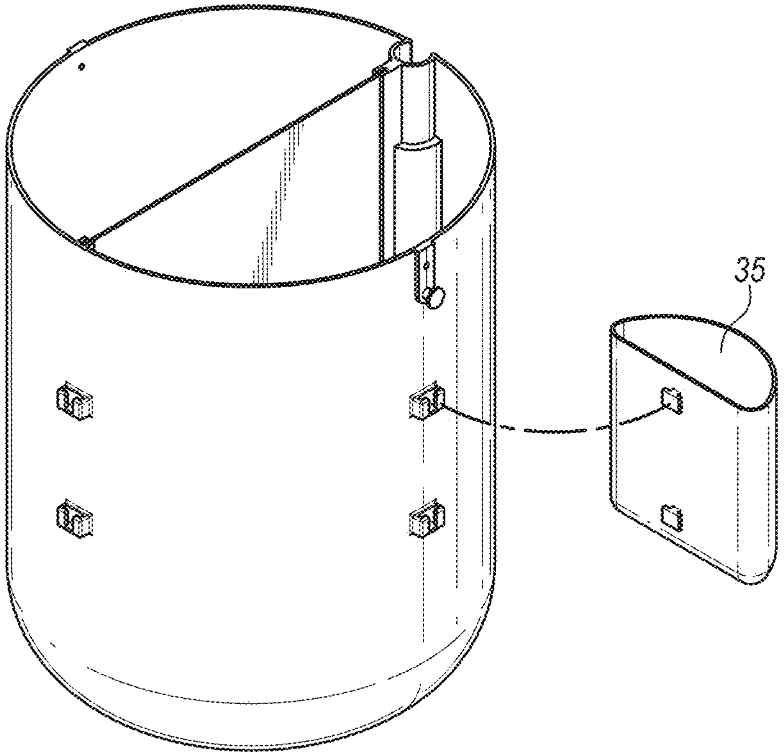
FIG. 5 is a second back perspective view thereof, showing a detached pocket.
Figure 6:
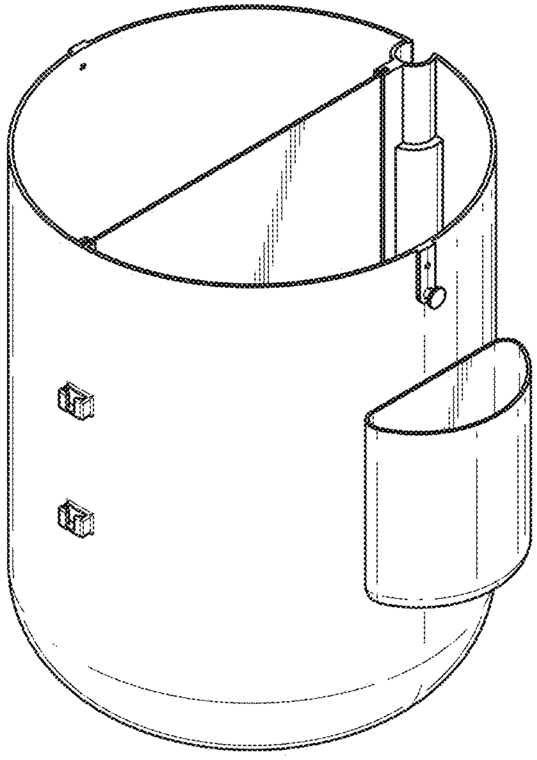
FIG. 6 is a third back perspective view thereof, showing the pocket attached.

FIGS. 5 and 6 show a rigid pocket 35 having a pair of male accessory attachment points. Pocket 35 is only one example of accessories that can have male accessory attachment points that couple to sidewall 5. These male accessory attachment points slide and lock into a corresponding pair of female accessory attachment points, thereby securing the accessory. While it is possible to create accessories having only one male attachment point, two are preferred, to better stabilize the accessory against the sidewall 5 and prevent it from twisting in place or falling off.

Although embodiments and examples of the invention have been shown and described, it is to be understood that various modifications, substitutions, and rearrangements of parts, components, steps, as well as other uses, shapes, construction, and design of this system can be made by those skilled in the art without departing from the novel spirit and scope of this invention.

I claim:

1. A groundskeeping receptacle with integrated trash picker retainer, comprising:

a. a bottom;

b. a sidewall attached to and rising vertically upward from the bottom, thereby defining an interior space, this sidewall having:

i. an exterior surface;

ii. an interior surface;

iii. a top circumferential edge opposite the bottom; and iv. an indentation of a lower stem of a trash picker made into the top circumferential edge, this indentation extending downward along the sidewall toward the bottom and branching out into two jaws, this indentation dimensioned to selectively accept and retain by snap fit a lower stem and two jaws of a trash picker;

c. a first vertical guide attached to the interior surface of the sidewall, directly against the indentation;

d. a second vertical guide attached to the interior surface of the sidewall, diametrically opposed to the first vertical guide;

e. a selectively removable divider that slides downward into the first vertical guide and second vertical guide, all the way to the bottom, thereby dividing the interior space in half;

f. a plurality of female accessory attachment points disposed on the exterior surface of the sidewall; and g. a pair of diametrically opposed buttons attached to the exterior surface of the sidewall, these buttons circumferentially spaced apart from the indentation.

2. The groundskeeping receptacle of claim 1, further comprising a plurality of accessories having at least one male attachment point dimensioned to couple to, and be retained by, a corresponding female attachment point.

3. The groundskeeping receptacle of claim 2, wherein the accessories having at least one male attachment point comprise pockets.

4. The groundskeeping receptacle of claim 1, wherein the bottom, the sidewall, the first vertical guide, the second vertical guide, the divider and the female accessory attachment points are made from a rigid and waterproof material.

5. The groundskeeping receptacle of claim 2, wherein the bottom, the sidewall, the first vertical guide, the second vertical guide, the divider and the female accessory attachment points are made from high-density polyethylene.

* * * * *